United States Patent Office 2,717,914
Patented Sept. 13, 1955

2,717,914
RETARDING OF SULFUR VULCANIZATION

Lynn Harbison, Akron, Ohio, assignor to Phillips Petroleum Company, a corporation of Delaware No Drawing. Application January 11, 1952,
Serial No. 266,087

23 Claims. (Cl. 260—763)

This invention relates to the production of rubber products. In one aspect, this invention relates to the retardation of vulcanization of rubber mixes. In another aspect it relates to retarding too rapid acceleration of vulcanization caused by high pH carbon black. In another aspect this invention relates to the use of organic hydroperoxides as scorch retarders. In still another aspect this invention relates to new vulcanized rubber products, and rubber mixes.

In the manufacture of rubber products, crude rubber is milled with the desired fillers, softeners, sulfur and accelerators. In the first stage of plant processing, carbon black and other ingredients, except the accelerator of vulcanization and sulfur, are added with the mixing temperature reaching a maximum in the range of 290° to 330° F., especially for tread compounds. A mixed stock, whether mill mixed or Banbury mixed, is cooled with a water spray in order to aid in reducing the temperature of the mixed stock to room temperature as soon as possible. After this first stage mixing, the rubber mix is placed on what is termed a "sheet-out" mill and the mixed stock is cut in slabs and then subjected to a water spray. These slabs are then cooled in the air, usually for about one-half to three-quarters of an hour, and then placed on a skid to age, generally for a minimum of 5 hours. The second step is to take this master batch form and add the accelerator and sulfur in a Banbury mixer or on a mill. During this step the temperature should not be greater than 230° F., decidedly cooler than the original mix when the carbon black is added. This final mix is cooled with a water spray, air-cooled and then aged at room temperature. This mixed stock is cooled as rapidly as possible in order to avoid "scorched" material. The next step in processing is calendering or tubing which is usually carried on in the range of 150° to 300° F. The calendered or tubed product is then vulcanized. The most common vulcanizing temperature for tires is 260° to 300° F. For very large tires the curing temperature may be dropped to as low as 260° F. In the case of molded industrial products, a temperature of about 320° F., is the upper range at which vulcanization is carried out. In carrying out the plant processes of second stage mixing and of calendering or tubing, it is necessary that the mixed rubber is not partially vulcanized prematurely. If vulcanization occurs prematurely in factory processing, factory operations cannot be carried out efficiently. This premature vulcanization is known as scorching.

In recent years many new carbon blacks have become available to the rubber industry. Chief among new carbon blacks are combustion furnace carbon blacks, which in general have a higher pH than the older type of channel black or thermal furnace carbon blacks. Combustion furnace carbon blacks have a pH of from 8 to 10.5, usually from 8.6 to 10.1. For instance, one commercially available high abrasion combustion furnace (HAF) black, has a pH of approximately 9.1 and a commercially available high modulus combustion furnace (HMF) black, has a pH of approximately 9.7. In contrast to the pH of these combustion furnace blacks, channel blacks usually have a pH value on the acid side in the neighborhood of 3.8 to 6. Furnace blacks such as those just mentioned have many characteristics which add useful properties to the finished rubber product. Thus, the HAF black has a high degree of "structure" and rubber products containing this black have exceptionally high resistance to abrasion. There are several high pH furnace blacks now on the market which add valuable properties to the finished rubber product. These high pH carbon blacks have caused considerable difficulty to the rubber compounder and processor as pointed out by C. W. Sweitzer and W. C. Goodrich in The Rubber Age, volume 55, No. 5, August 1944, at page 471. The pH of the carbon black has a decided effect on the rate of vulcanization. High pH carbon blacks accelerate cure or vulcanization. Sweitzer and Goodrich point out that due to this factor economy in organic acceleration is permitted. However, in most cases changing the recipe of a rubber mix, that is, changing the amount of organic accelerator and sulfur, also changes the properties of the finished rubber product. It has an effect on such properties as tensile strength, heat build-up, the compression set, the hardness, the resistance to abrasion, the modulus of elasticity, the elongation, etc. Accelerator starvation with HAF black results in low abrasion resistance. The rubber compounder using these high pH carbon blacks has been confronted with the problem of maintaining the desired properties in the finished product by maintaining the proper amount of organic accelerator and sulfur while trying to overcome the problem of scorch or premature vulcanization. Well-known retarders of vulcanization such as N-nitroso diphenyl amine, rosin and salicylic acid in a dispersing agent have been unsuccessful in overcoming the problem.

In accordance with my invention I have provided a method for retarding vulcanization, and substantially eliminating premature vulcanization or scorching, of a rubber mix in which vulcanization has been accelerated due to the presence of high pH carbon black. My invention provides for incorporating with the rubber mix to be vulcanized, so as to effectively slow up vulcanization in order that the rubber mix may be processed without encountering scorch, an organic hydroperoxide containing not more than 30 carbon atoms, characterized by the structural formula

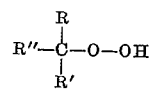

wherein R is a radical selected from the group consisting of hydrogen, alkyl, aryl, substituted aryl, alkenyl and cycloalkenyl, and wherein R' and R'' are each radicals selected from the group consisting of alkyl, substituted aryl, aryl, alkenyl, cycloalkyl and radicals which together with the tertiary carbon form a carbocyclic ring. Exemplary of the class of organic hydroperoxides described are:

Tertiary butyl hydroperoxide, tertiary amyl hydroperoxide, dimethyl-n-propylhydroperoxymethane, methyldiethylhydroperoxymethane, cumene hydroperoxide (dimethylphenylhydroperoxymethane), para-isopropylcumene hydroperoxide [dimethyl (4-isopropylphenyl) hydroperoxymethane], para-tertiarybutylcumene hydroperoxide [dimethyl (4-tertiarybutylphenyl) hydroperoxymethane], monochloro-para-isopropylcumene hydroperoxide [dimethyl (monochloro-4-isopropylphenyl) hydroperoxymethane], methoxycumene hydroperoxide [dimethyl (4-methoxyphenyl) hydroperoxymethane], diethylbenzene monohydroperoxide [methyl (ethyl phenyl) hydroperoxymethane], diisopropylbenzene hydroperoxide [dimethyl (isopropylphenyl) hydroperoxymethane], paramenthane hydroperoxide [dimethyl (4-methylcyclohexyl) hydroperoxymethane], phenylcyclohexane hydroperoxide (1-phenyl-1-hydroperoxy cyclohexane), alpha naphthyl cyclohexane hydroperoxide [1-(1-naphthyl)-1-hydroperoxycyclohexane], the corresponding beta naphthyl compound, p-methoxyphenyl cyclohexane hydroperoxide [1-(4-methoxyphenyl)-1-hydroperoxycyclohexane], the corresponding p-phenoxy phenyl and p-chlorophenyl compounds, alpha and beta phenyl decalin hydroperoxides (1-phenyl-1-hydroperoxy-decahydronaphthalene and 2-phenyl-2 hydroperoxy-decahydronaphthalene, and the like, and the hydroperoxides of octahydrophenanthrene (1,2,3,4,4a,9,10,10a-octahydrophenanthrene), benzooctahydrophenanthrene, derivatives of either in which one to four methyl groups each replaces only one hydrogen per carbon atom in the octahydro part of the molecule, and/or one to two hydrogen atoms on the unhydrogenated aromatic part of the molecule is replaced by at least one of the substituents selected from the group consisting of methyl, ethyl, methoxy, ethoxy, hydroxy, and halogen other than iodine.

Premature vulcanization, referred to as "scorch" during the processing of rubber products, must be prevented in order to allow the rubber mix to be preformed and shaped before it is cured or vulcanized. Testing methods, run on test samples, have been devised and standards have been set so as to determine if a particular rubber mix will scorch during processing. The most frequently used testing method is that run on a Mooney shearing disc viscometer. These Mooney viscometers come equipped with a large rotor (1½ inches in diameter) and a small rotor (⅜₁₆ inch in diameter). The viscometer can be set to operate at a given temperature. The Mooney scorch test is made by using the small rotor with the machine usually set to operate at 250° F., that is, the temperature of the rubber sample on which the scorch test is being run is held at 250° F. Primarily, the instrument consists of a disc rotor which turns in a shallow cylindrical chamber recessed into two horizontal platens. The surfaces of the chamber and rotor are knurled to prevent slippage. The sample is formed in place around the rotor as the chamber is closed. The rubber is sheared by the rotor which is driven by a synchronous motor. The resistance of the rubber to this shearing action develops a thrust in a floating horizontal worm shaft which presses against a deflecting U-shaped steel spring. The deflection is read on a dial gauge and is proportional to the true mean viscosity of the sample. In determining the scorch time, deflection readings are taken at one minute intervals until the deflection of the indicator increases appreciably. At this point the viscosity of the rubber mix sample has increased due to the beginning of vulcanization. The Mooney scorch time is then given as the time in minutes at which vulcanization began, indicated by the appreciable increase in viscosity readings. In this disclosure Mooney scorch time when used means the time in minutes at which the viscosity of the sample began to increase appreciably because of vulcanization. Mooney shearing disc viscometers are widely used in the rubber industry, and one skilled in the art will have no difficulty in determining and understanding what I mean by the Mooney scorch time.

I have discovered that the organic hydroperoxides described above will effectively retard vulcanization of rubber mixes which vulcanize too rapidly due to the use of a high pH carbon black. The organic hydroperoxides can be incorporated in the rubber mix before, during or after the other ingredients are added. In practicing my invention they can be added either on a mill or in a Banbury mixer or they may be mixed with the carbon black before the black is added in the first stage of mixing. The organic hydroperoxides used in the practice of my invention will retard too rapid vulcanization caused by a high pH carbon black in rubber mixes containing natural, synthetic or reclaimed rubber, or various mixtures of the above-mentioned types of rubber. The organic hydroperoxides of this invention are particularly adaptable to the problems of tire tread manufacture in which the rubber mix from which the tread is formed contains from 50 to 65 parts of carbon black per 100 parts of rubber, usually natural rubber or the new synthetic copolymers butadiene-styrene produced at low temperatures, such as GR-S rubber and recently developed "low-temperature" variants thereof. Most rubber mixes contain from 10 to 65, often 40–65, parts of carbon black per 100 parts of rubber. The problem of too rapid vulcanization becomes greater as the amount of high pH carbon black is increased; therefore, it is necessary that a greater amount of the organic hydroperoxide be added as the amount of carbon black is increased in order to effectively retard vulcanization. In practicing my invention, one skilled in the art will have no trouble in determining the amount of hydroperoxide necessary to effectively retard vulcanization for any particular recipe or rubber mix. The Mooney scorch time for any particular rubber mix may be determined and the addition of the hydroperoxide will increase this Mooney scorch time so that there will be no problem of premature vulcanization during processing. Mooney scorch times of 20 minutes or longer at 250° F. are advantageously employed in processing the rubber mix without the mix scorching.

My invention is applicable to rubber mixes containing organic accelerators of vulcanization. The ultra accelerators and semi-ultra accelerators of vulcanization tend to cause scorching when used with high pH carbon blacks. The hydroperoxides used in accordance with my invention will retard acceleration of vulcanization caused by high pH carbon black. My invention is particularly adaptable to retarding vulcanization in rubber mixes containing N-cyclohexyl-2-benzothiazolesulfenamide, benzothiazyl sulfide or its derivatives such as zinc benzothiazyl sulfide and acyl benzothiazyl sulfide. My invention is also particularly adaptable to those rubber mixes containing mercaptobenzothiazole and its derivatives such as the dinitro phenyl ester of mercaptobenzothiazole. Other widely used accelerators of vulcanization such as thiuram monosulfide or its derivatives also give too rapid vulcanization when used with high pH carbon blacks, and my organic hydroperoxides will effectively retard vulcanization when these accelerators are used along with high pH carbon blacks. Sometimes a rubber compounder will use more than one accelerator in a given rubber mix. The hydroperoxide of this invention will effectively retard vulcanization when a mixture of organic accelerators is used in conjunction with a high pH carbon black. For instance, rubber mixes containing any of the named accelerators usually contain from 0.6 to 2.5 parts of the accelerator per 100 parts of rubber and 2 to 3 parts of sulfur per 100 parts of rubber. The organic hydroperoxide in the range of 0.5 to 3.0 parts per 100 parts of rubber will effectively retard vulcanization or increase the Mooney scorch time of such a rubber mix. 0.8 to 1 part of the accelerator per 100 parts of rubber with 2.00 to 2.75 parts of sulfur per 100 parts of rubber will cover the most commonly practiced range. The Mooney scorch time, as run on test samples, gives a good indication of the process scorching possibilities of a particular rubber mix. In the following examples of my invention the amounts, particular ingredients and conditions are given as typical and are not to be construed so as to narrow the scope of my invention.

My invention is illustrated by way of the following examples.

EXAMPLE I

A control compound was made up in accordance with the following recipe:

| | Parts by weight |
|---|---|
| Smoked sheets | 100.0 |
| HAF Carbon Black (pH 9.1) | 50.0 |
| Zinc oxide | 5.0 |
| Akroflex F [1] | 1.0 |
| Stearic acid | 3.0 |
| L. V. asphaltum oil (plasticizer) | 3.0 |
| Sulfur | 2.5 |

[1] An antioxidant comprising phenyl-beta-naphthylamine and diphenyl-para-phenylene-diamine.

Five-tenths of one part per hundred parts rubber of N-cyclohexyl-2-benzothiazole-sulfenamide, a commercially available vulcanization accelerator (Santocure), was added to a sample of this control recipe. A Mooney scorch test was run on the resulting accelerator-containing control sample giving a scorch time of 20 minutes at 250° F.

Five separate samples of rubber compounds made in accordance with the above-described recipe were each tested for Mooney scorch time, each containing 0.5 part of Santocure (per hundred parts rubber) and 1 part of an organic hydroperoxide (per hundred parts of rubber) as a scorch retarder. Pertinent data relating to these tests are set forth in the following tabulation:

| Sample Number | Organic Hydroperoxide | Mooney scorch time at 250° F., minutes |
|---|---|---|
| 0 | None (control) | 20 |
| 1 | Para-isopropyl cumene hydroperoxide | 23 |
| 2 | Para-tert-butyl cumene hydroperoxide | 23 |
| 3 | Monochloro-para-isopropyl cumene hydroperoxide | 24 |
| 4 | Methoxy cumene hydroperoxide | 22 |
| 5 | Diethyl benzene mono hydroperoxide | 24 |

It is evident that the Mooney scorch time of each of these samples was raised sufficiently to eliminate or markedly reduce scorching during processing.

Other data pertinent to the properties of these mixes, as obtained by means of the Mooney viscometer, are tabulated below:

*Mooney viscometer readings (212° F.)*

| Sample Number | 0 | 1 | 2 | 3 | 4 | 5 |
|---|---|---|---|---|---|---|
| Large rotor, 1½ Min | 51 | 53 | 59 | 60 | 62 | 52 |
| Large rotor, 4 Min | 43 | 46 | 50 | 61 | 53 | 44 |

The rubber mixes described above, samples 0 to 5, were vulcanized. The following tabulation sets forth data resulting from physical tests made on the vulcanizates formed.

*Physical test data*

| Sample Number | 0 | 1 | 2 | 3 | 4 | 5 |
|---|---|---|---|---|---|---|
| STRESS-STRAIN (ORIGINAL) TEMP. 78° F. (AVERAGE) | | | | | | |
| 300% Modulus (p. s. i.) | | | | | | |
| Min. Cure at 230° F.: | | | | | | |
| 30 | 1,790 | 1,900 | 1,825 | 1,770 | 1,780 | 1,700 |
| 60 | 1,960 | 2,050 | 1,920 | 1,990 | 2,100 | 1,925 |
| 400% Modulus (p. s. i.) | | | | | | |
| 30 | 2,725 | 2,775 | 2,750 | 2,675 | 2,675 | 2,580 |
| 60 | 2,940 | 2,975 | 2,870 | 2,960 | 3,040 | 2,860 |

*Physical test data—continued*

| Sample Number | 0 | 1 | 2 | 3 | 4 | 5 |
|---|---|---|---|---|---|---|
| Ultimate Tensile (p. s. i.) | | | | | | |
| 30 | 4,025 | 4,160 | 4,160 | 4,040 | 4,240 | 4,075 |
| 60 | 3,900 | 4,060 | 3,775 | 4,175 | 4,240 | 4,025 |
| Ultimate Elongation (percent) | | | | | | |
| 30 | 565 | 570 | 575 | 570 | 600 | 595 |
| 60 | 510 | 520 | 545 | 530 | 540 | 540 |
| Shore A Hardness | | | | | | |
| 30 | 60 | 60 | 60 | 59 | 60 | 59 |
| 60 | 62 | 62 | 61 | 61 | 62 | 61 |
| STRESS-STRAIN (AGED 48 HRS. @ 212° F.) TEMP. 74° F. | | | | | | |
| 300% Modulus (p. s. i.) | | | | | | |
| 30 | 2,160 | 2,225 | 2,190 | 2,220 | 2,260 | 2,025 |
| 45 | 2,275 | 2,270 | 2,260 | 2,280 | 2,225 | 2,000 |
| Ultimate Tensile (p. s. i.) | | | | | | |
| 30 | 2,680 | 2,630 | 2,660 | 2,675 | 2,760 | 2,625 |
| 60 | 2,100 | 2,160 | 2,000 | 2,160 | 2,190 | 1,990 |
| Ultimate Elongation (percent) | | | | | | |
| 30 | 370 | 355 | 355 | 360 | 360 | 380 |
| 60 | 295 | 285 | 290 | 290 | 295 | 290 |
| Shore A Hardness | | | | | | |
| 30 | 67 | 67 | 66 | 66 | 66 | 64 |
| 60 | 66 | 68 | 67 | 66 | 65 | 66 |
| GOODRICH FLEXOMETER DATA: OVEN TEMP. 100° F., LOAD 143 P. S. I., COMPRESSION 17.5% | | | | | | |
| Temperature Rise, °F.: | | | | | | |
| 60 | 34.5 | 33.4 | 34 | 34 | 33.5 | 35.5 |
| 90 | 37.0 | 37.0 | 37.5 | 46.5 | 36.5 | 36.0 |
| PERCENT COMPRESSION SET— ASTM METHOD B | | | | | | |
| 60 | 21.7 | 20.5 | 21.0 | 21.4 | 21.2 | 22.6 |
| 90 | 15.8 | 16.1 | 15.7 | 15.1 | 15.4 | 16.3 |
| DEMATTIA FLEX DATA: FLEXURES IN THOUSANDS, OVEN TEMP. 210° F., STROKE 2¼ IN., R. P. M., 300, AGED 24 HRS. @ 158° F. | | | | | | |
| 60 | 36.8 | 44.0 | 40.0 | 37.2 | 36.0 | 44.8 |
| 90 | 36.7 | 64.5 | 62.2 | 40.4 | 43.7 | 57.4 |
| ANGLE ABRASION, COS. LOSS: 11° YOKE ANGLE, 32 LB. LOAD, 2,400 REVOLUTIONS | | | | | | |
| 60 | 9.84 | 9.80 | 9.80 | 9.77 | 9.50 | 10.08 |
| 90 | 8.55 | 9.18 | 9.50 | 9.68 | 9.13 | 8.92 |

The foregoing physical test data indicate that the properties of the rubber mixes 1 to 5 are substantially the same as those of the control (except for the improvement in scorch time); hence the organic hydroperoxides of this example are satisfactory and advantageous for use in rubber compounding.

EXAMPLE II

A control compound was made up in accordance with the following recipe:

|   | Parts by weight |
|---|---|
| Smoked sheets | 100.0 |
| HAF Carbon Black (pH 9.1) | 50.0 |
| Zinc oxide | 5.0 |
| Akroflex F | 1.0 |
| Stearic acid | 3.0 |
| L. V. asphaltum oil (plasticizer) | 3.0 |
| Sulfur | 2.5 |

Five-tenths of one part per hundred parts rubber of N-cyclohexyl-2-benzothiazolesulfenamide, a commercially available vulcanization accelerator (Santocure) was added to a sample of this control recipe. A Mooney scorch test was run on the resulting accelerator-containing control sample, giving a scorch time of 24 minutes at 250° F.

Three samples of rubber compounds made in accordance with the above described recipe were each tested for Mooney scorch time, each containing 0.5 part Santocure (per hundred parts rubber) and one part of an organic hydroperoxide (per hundred parts of rubber) as a scorch retarder. Mooney scorch data are set forth in the following tabulation:

| Sample Number | Organic Hydroperoxide | Mooney Scorch Time @ 250° F., minutes |
|---|---|---|
| 00 | None (control) | 24 |
| 6 | Para-Menthane Hydroperoxide | 31 |
| 7 | Cumene Hydroperoxide | 31 |
| 8 | Diisopropylbenzene Hydroperoxide | 28 |

A substantial increase in Mooney scorch time, resulting from the use of the organic hydroperoxides indicated, is evident from the foregoing data.

Other data pertinent to the properties of these mixes, as obtained by means of the Mooney viscometer, are tabulated below:

*Mooney viscometer readings (212° F.)*

| Sample Number | 00 | 6 | 7 | 8 |
|---|---|---|---|---|
| Large rotor, 1½ min | 61 | 53 | 63 | 60 |
| Large rotor, 4 min | 53 | 47 | 57 | 53 |

The following tabulation sets forth physical test data on vulcanizates formed from the above identified samples:

*Physical test data*

| Sample Number | 00 | 6 | 7 | 8 |
|---|---|---|---|---|
| STRESS-STRAIN (ORIGINAL) TEMP. 76° (AVE.) | | | | |
| 300% Modulus (p. s. i.) | | | | |
| Minutes Cure at 280° F.: | | | | |
| 30 | 2,000 | 2,025 | 1,975 | 1,950 |
| 60 | 2,140 | 2,075 | 2,225 | 2,140 |
| Ultimate Tensile (p. s. i.) | | | | |
| 30 | 4,075 | 4,175 | 4,020 | 4,025 |
| 60 | 4,100 | 3,875 | 3,870 | 3,830 |
| Ultimate Elongation (percent) | | | | |
| 30 | 530 | 540 | 530 | 530 |
| 60 | 510 | 490 | 460 | 485 |
| Shore A Hardness | | | | |
| 30 | 62 | 61 | 60 | 59 |
| 60 | 64 | 63 | 63 | 63 |

*Physical test data—continued*

| Sample Number | 00 | 6 | 7 | 8 |
|---|---|---|---|---|
| STRESS-STRAIN (AGED 48 HRS. @ 212° F.) | | | | |
| 200% Modulus (p. s. i.) | | | | |
| 30 | 1,400 | 1,440 | 1,370 | 1,460 |
| 60 | 1,450 | 1,325 | 1,475 | 1,460 |
| Ultimate Tensile (p. s. i.) | | | | |
| 30 | 2,340 | 2,570 | 2,550 | 2,525 |
| 60 | 1,900 | 1,800 | 1,850 | 1,940 |
| Ultimate Elongation (percent) | | | | |
| 30 | 305 | 315 | 330 | 315 |
| 60 | 240 | 255 | 240 | 255 |
| Shore A Hardness | | | | |
| 30 | 67 | 66 | 64 | 65 |
| 60 | 66 | 66 | 66 | 67 |
| GOODRICH FLEXOMETER DATA: OVEN 100° F., LOAD 143 P. S. I., COMPRESSION 17.5% | | | | |
| Temperature Rise, ° F.: | | | | |
| 60 | 40 | 38 | 36 | 38.5 |
| 90 | 38.5 | 39.5 | 36.5 | 39.5 |
| PERCENT COMPRESSION SET— ASTM METHOD B | | | | |
| 60 | 18.2 | 19.3 | 18.8 | 18.8 |
| 90 | 14.0 | 15.4 | 14.3 | 14.3 |
| DeMATTIA FLEX DATA: FLEXURES IN THOUSANDS, OVEN TEMP. 210° F., STROKE 2¼ IN., R. P. M., 300, AGED 24 HOURS @ 158° F. | | | | |
| 60 | 64.9 | 65.9 | 42.1 | 55.4 |

The foregoing data show that rubber compounds having properties similar to those of the control, but with improved scorch time, can be prepared using the organic hydroperoxides of this invention.

EXAMPLE III

A control compound was made up in accordance with the following recipe:

|   |   |
|---|---|
| Smoked sheets | 100.00 |
| Philblack O [1] | 50.00 |
| Zinc oxide | 5.00 |
| Thermoflex A [2] | 1.00 |
| Stearic acid | 3.00 |
| L. V. Asphaltum oil (plasticizer) | 3.00 |
| Sulfur | 2.50 |

[1] HAF carbon black (pH 9.1).
[2] An antioxidant comprising di-para-methoxy-diphenylamine (25%) diphenyl-para-phenylenediamine (25%) and phenyl-beta-naphthylamine (50%).

0.5 part (per hundred parts of rubber) of N-cyclohexyl - 2 - benzothiazolesulfenamide (Santocure), was added to a sample of this control recipe. A Mooney scorch test was run on the resulting accelerator-containing sample, giving a scorch time of 17 minutes at 250° F.

1 part per hundred parts of rubber of tertiarybutyl hydroperoxide (as a scorch retarder) was added to each of two separate samples of the control compound described immediately hereinabove, each separate sample containing also 0.5 part (per hundred parts rubber) of Santocure. Each of these samples was then tested for Mooney scorch time. Pertinent data relating to these tests are set forth in the following tabulation. In compounding one sample, the tertiary butyl hydroperoxide was incorporated with the accelerator-containing batch sample by adding on the mil, and the resulting hydroperoxide-containing mix is designated as sample A, hereinbelow. Sample B designated hereinbelow is the same as sample A except that the tertiary butylhydroperoxide was incorporated with the mix in the Banbury mixer.

| Sample | Mooney Scorch time at 250° F., minutes |
|---|---|
| Control | 17 |
| A | 20 |
| B | 24 |

Thus, the Mooney scorch time of each of the samples A and B was raised sufficiently to eliminate or markedly reduce scorching during processing.

Other data pertinent to the properties of these mixes, A and B, as obtained by means of the Mooney viscometer, are tabulated below:

*Mooney viscometer readings (212° F.)*

| Sample | Control | A | B |
|---|---|---|---|
| Large rotor, 1½ minutes | 54 | 52 | 48 |
| Large rotor, 4 minutes | 47 | 47 | 42 |

The rubber mixes described above, i. e. the control and samples A and B, were vulcanized. The following tabulation sets forth data resulting from physical tests made on the vulcanizates formed.

*Physical test data*

| Sample | Control | A | B |
|---|---|---|---|
| STRESS-STRAIN (ORIGINAL) TEMP. 71° F. | | | |
| 200% Modulus (p. s. i.) | | | |
| Min. Cure at 280° F.: | | | |
| 30 | 1,020 | 1,080 | 1,230 |
| 60 | 1,110 | 1,190 | 1,230 |
| 300% Modulus (p. s. i.) | | | |
| 30 | 2,000 | 2,080 | 2,140 |
| 60 | 2,170 | 2,250 | 2,280 |
| Ultimate Tensile (p. s. i.) | | | |
| 30 | 4,400 | 4,260 | 4,340 |
| 60 | 4,270 | 4,190 | 4,320 |
| Ultimate Elongation (percent) | | | |
| 30 | 555 | 525 | 560 |
| 60 | 505 | 495 | 515 |
| Shore A Hardness | | | |
| 30 | 63 | 64 | 63 |
| 60 | 65 | 65 | 66 |
| STRESS-STRAIN (AGED 48 HRS. AT 212° F.) | | | |
| 200 % Modulus | | | |
| Minutes Cure at 280° F.: | | | |
| 30 | 1,310 | 1,400 | 1,380 |
| 60 | 1,395 | 1,580 | 1,520 |
| Ultimate Tensile (p. s. i.) | | | |
| 30 | 2,390 | 2,470 | 2,460 |
| 60 | 2,005 | 2,170 | 2,190 |

*Physical test data—continued*

| Sample | Control | A | B |
|---|---|---|---|
| Ultimate Elongation (p. s. i.) | | | |
| 30 | 320 | 320 | 315 |
| 60 | 260 | 265 | 275 |
| Shore A Hardness | | | |
| 30 | 66 | 67 | 67 |
| 60 | 67 | 68 | 67 |
| GOODRICH FLEXOMETER DATA: OVEN TEMP. 100° F., LOAD 143 P. S. I., COMPRESSION 17.5 PERCENT | | | |
| Temperature Rise, ° F.: | | | |
| 60 | 35.5 | 35.5 | 37.5 |
| PERCENT COMPRESSION SET—ASTM METHOD B | | | |
| 60 | 20.15 | 20.2 | 21.3 |
| DeMATTIA FLEX DATA: FLEXURES IN THOUSANDS OVEN TEMP. 210° F., STROKE 2¼ IN., R. P. M., 300, AGED 24 HOURS AT 158° F. | | | |
| 60 | 45.1 | 46.2 | 40.8 |
| ANGLE ABRASION, CCS. LOSS: 11° YOKE ANGLE, 32 LB. LOAD, 2,400 REVOLUTIONS | | | |
| 60* | 3.86 | 3.91 | 4.08 |
| 60** | 4.86 | 4.75 | 5.12 |

*Unaged.
**Aged 48 hours at 212° F.

Reasonable variation and modification are possible within the scope of the foregoing disclosure and the appended claims to the invention, the essence of which is that the organic hydroperoxides described herein are effective scorch retarders in the vulcanization of rubber mixes containing high pH carbon black; and vulcanizable mixtures, and vulcanizates containing the said hydroperoxides.

I claim:

1. In the process of making rubber products wherein the rubber mix, containing an organic accelerator of vulcanization, sulfur and a high pH furnace carbon black having a pH of from 8.6 to 10.5, is preformed and vulcanized, that improvement of retarding vulcanization which consists of adding an organic hydroperoxide containing not more than 30 carbon atoms in the molecule and characterized by the structural formula

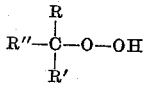

wherein R is a radical selected from the group consisting of H, alkyl, aryl, substituted aryl, alkenyl, and cycloalkenyl and wherein R' and R" are each radicals selected from the group consisting of alkyl, aryl, substituted aryl, alkenyl, cycloalkyl and radicals which together with the tertiary carbon atom form a carbocyclic ring, as the retarder to said rubber mix in an amount of 0.5 to 3.0 parts per 100 parts of rubber.

2. In the process of making rubber products wherein the rubber mix, containing from 0.6 to 2.5 parts of an organic accelerator of vulcanization per 100 parts of rubber, 2 to 3 parts of sulfur per 100 parts of rubber and from 10 to 65 parts of a furnace carbon black having a pH of from 8.6 to 10.1 per 100 parts of rubber, is preformed and vulcanized, that improvement of retarding vulcanization which consists of adding an organic hydroperoxide containing not more than 30 carbon atoms in the molecule and characterized by the structural formula

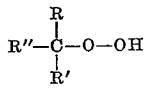

wherein R is a radical selected from the group consisting of H, alkyl, aryl, substituted aryl, alkenyl, and cycloalkenyl and wherein R' and R'' are each radicals selected from the group consisting of alkyl, aryl, substituted aryl, alkenyl, cycloalkyl and radicals which together with the tertiary carbon atom form a carbocyclic ring as the retarder to said rubber mix in an amount of from 0.5 to 3.0 parts per 100 parts of rubber.

3. The process of claim 1 wherein said rubber is natural rubber.

4. The process of claim 1 wherein said accelerator is N-cyclohexyl-2-benzothiazolesulfenamide.

5. The process of claim 1 wherein said hydroperoxide is tertiarybutyl hydroperoxide.

6. The process of claim 1 wherein said hydroperoxide is diethylbenzene monohydroperoxide.

7. The process of claim 1 wherein said hydroperoxide is monochloro-paraisopropyl cumene hydroperoxide.

8. The process of claim 1 wherein said hydroperoxide is a cumene hydroperoxide.

9. The process of claim 2 wherein said rubber mix contains from 0.8 to 1 part of said accelerator, from 2.0 to 2.75 parts of sulfur, and from 40 to 65 parts of a furnace black having a pH of from 8.6 to 10.1.

10. A vulcanizable rubber mix comprising rubber, an organic accelerator of vulcanization, sulfur, furnace carbon black having a pH of from 8.6 to 10.5 and a vulcanization retarder consisting of an organic hydroperoxide containing not more than 30 carbon atoms in the molecule and characterized by the structural formula

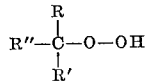

wherein R is a radical selected from the group consisting of H, alkyl, aryl, substituted aryl, alkenyl, and cycloalkenyl and wherein R' and R'' are each radicals selected from the group consisting of alkyl, aryl, substituted aryl, alkenyl, cycloalkyl and radicals which together with the tertiary carbon atom form a carbocyclic ring, in an amount of from 0.5 to 3.0 parts per 100 parts of said rubber.

11. A product of vulcanization of the said rubber mix of claim 10.

12. A rubber mix of claim 10 containing from 0.6 to 2.5 parts of said accelerator, from 2 to 3 parts of sulfur and from 10 to 65 parts of said carbon black and from 0.5 to 3.0 parts of said retarder, and wherein said rubber is natural rubber, all parts being per 100 parts of rubber.

13. A composition of claim 10 wherein said hydroperoxide is tertiary-butyl hydroperoxide.

14. The rubber mix of claim 10 wherein said hydroperoxide is diethylbenzene monohydroperoxide.

15. The rubber mix of claim 10 wherein said hydroperoxide is monochloro-paraisopropyl cumene hydroperoxide.

16. The rubber mix of claim 10 wherein said hydroperoxide is a cumene hydroperoxide.

17. The rubber mix of claim 10 wherein said rubber is natural rubber.

18. In the process of making rubber products wherein the rubber mix, containing an organic accelerator of vulcanization, sulfur and a high pH furnace carbon black having a pH of from 8.6 to 10.5, is preformed and vulcanized, that improvement of retarding vulcanization which comprises incorporating with said rubber mix an organic hydroperoxide containing not more than 30 carbon atoms in the molecule and characterized by the structural formula

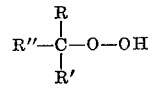

wherein R is a radical selected from the group consisting of H, alkyl, aryl, substituted aryl, alkenyl, and cycloalkenyl and wherein R' and R'' are each radicals selected from the group consisting of alkyl, aryl, substituted aryl, alkenyl, cycloalkyl and radicals which together with the tertiary carbon atom form a carbocyclic ring, the amount of said hydroperoxide being that sufficient to retard said vulcanization.

19. A vulcanizable rubber mix comprising rubber, an organic accelerator of vulcanization, sulfur, furnace carbon black having a pH of from 8.6 to 10.5 and a vulcanization retarder comprising an organic hydroperoxide containing not more than 30 carbon atoms in the molecule and characterized by the structural formula

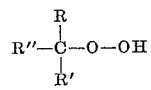

wherein R is a radical selected from the group consisting of H, alkyl, aryl, substituted aryl, alkenyl, and cycloalkenyl and wherein R' and R'' are each radicals selected from the group consisting of alkyl, aryl, substituted aryl, alkenyl, cycloalkyl and radicals which together with the tertiary carbon atom form a carbocyclic ring, the amount of said hydroperoxide being that sufficient to retard vulcanization of said mix.

20. A vulcanizable rubber mix comprising rubber, an organic accelerator of vulcanization, sulfur, furnace carbon black having a pH of from 8.6 to 10.5 and from 0.5 to 3.0 parts by weight of p-menthane hydroperoxide, per 100 parts by weight of said rubber as a retarder of vulcanization of said mix.

21. In a process for making rubber products wherein the rubber mix, containing an organic accelerator of vulcanization, sulfur, and carbon black having a pH of from 8.6 to 10.5, is preformed and vulcanized, that improvement of retarding vulcanization which consists of adding from 0.5 to 3.0 parts by weight of p-menthane hydroperoxide, per 100 parts by weight of rubber, as a retarder of vulcanization of said rubber mix.

22. The process of claim 1 wherein said hydroperoxide is unsubstituted cumene hydroperoxide.

23. The rubber mix of claim 10 wherein said hydroperoxide is unsubstituted cumene hydroperoxide.

References Cited in the file of this patent

UNITED STATES PATENTS

| | | |
|---|---|---|
| 1,342,457 | Ostromishnsky | June 8, 1920 |
| 1,791,876 | Somerville | Feb. 10, 1931 |
| 2,430,993 | Rehner et al. | Nov. 18, 1947 |
| 2,582,829 | Harbison | Jan. 15, 1952 |

OTHER REFERENCES

"India Rubber World," vol. III of 1944, pages 309–311.